United States Patent [19]

Branner et al.

[11] Patent Number: 5,587,706
[45] Date of Patent: Dec. 24, 1996

[54] METHOD AND APPARATUS FOR POWER OFF CONTROL OF A SELECTIVE CALL RADIO

[75] Inventors: Donald L. Branner, Coral Springs; Andrew E. Ray, Delray Beach; Scott M. Peters, Coral Springs; Richard M. Huber, Boca Raton, all of Fla.

[73] Assignee: Motorola, Inc., Schaumburg, Ill.

[21] Appl. No.: 333,687

[22] Filed: Nov. 3, 1994

[51] Int. Cl.⁶ .................................. G08B 5/22; H04B 7/00
[52] U.S. Cl. ................. 340/825.44; 379/63; 455/38.2; 455/38.3
[58] Field of Search ...................... 340/825.44, 825.48, 340/286.09, 825.69; 455/343, 38.3, 38.2; 379/63

[56] References Cited

U.S. PATENT DOCUMENTS

| | | | |
|---|---|---|---|
| 4,544,923 | 10/1985 | Blatter et al. | 340/825.69 |
| 4,639,726 | 1/1987 | Ichikawa et al. | 340/825.44 |
| 5,109,401 | 4/1992 | Hattori et al. | |
| 5,331,317 | 7/1994 | Davis | 340/825.44 |
| 5,371,493 | 12/1994 | Sharpe et al. | 340/825.44 |
| 5,376,931 | 12/1994 | Marrs | 340/825.44 |
| 5,404,580 | 4/1995 | Simpson et al. | |

OTHER PUBLICATIONS

"PMR 2000 Series POCSAG Alphanumeric Display Personal Message Receiver" Instruction Manual pp. 1–5, published by Motorola, Inc., 1990.
"Pager with Restricted User Controls", Motorola Technical Developments, p. 121, published by Motorola, Inc. 1990.

*Primary Examiner*—Michael Horabik
*Assistant Examiner*—Edward Merz
*Attorney, Agent, or Firm*—James A. Lamb

[57] ABSTRACT

A selective call radio (100) includes a receiver section (103), an address detector (210), a power off command detector (220), and a power control section (240). The receiver section (103) is for receiving and demodulating a radio signal. The address detector (210) is for comparing an address demodulated by the receiver section (103) to at least one selective call address stored in the selective call radio (100). The address detector (210) is also for generating an address detect signal when the address matches one of the at least one selective call address within predetermined parameters. The power off command detector (220) is for generating a power off signal when the address detect signal is generated and the radio signal includes a power off command. The power control section (240) is responsive to the power off signal for changing a state of the selective call radio (100) to an off state.

5 Claims, 3 Drawing Sheets

METHOD AND APPARATUS FOR POWER OFF CONTROL OF A SELECTIVE CALL RADIO

FIELD OF THE INVENTION

This invention relates in general to power states in a selective call radio and in particular to control of power states in a selective call radio.

BACKGROUND OF THE INVENTION

A well known means of controlling power states of a selective call radio is to provide a user control, such as a momentary push button switch or a slide switch which, when activated, changes the mode of the selective call radio. A very commonly provided user control is a slide switch which is user activated for turning a selective call radio on and off. Another example of a user control is a push button switch which, when depressed by a user, causes a sequential display of several state names, from which the user can select a power state by releasing the push button during the display of the desired state name. A normal reason for putting a selective call radio into an off state is for battery saving in portable selective call radios.

These means work well in many circumstances, but a problem exists in current radios under circumstances which have arisen recently. Specifically, pagers are now being loaned to users for short periods to provide information to the user while the pager is on loan to the user. An example of this is a restaurant business, wherein a pager is loaned to patrons awaiting a table, who return the pager when an alert is received which indicates the table is available. Currently available pagers are typically controlled to be turned on and off by means of a user accessible control. In the off state, the receiver section of the pager is not powered and alerts are not received. Access to the user control for turning the pager off occasionally results in situation wherein a patron unwittingly puts the pager into the off state without realizing that he has done so, resulting in obvious customer dissatisfaction because the user misses the alert when it is transmitted.

Thus, what is needed is a way to prevent a user from putting a pager into an off state, while still allowing the pager to be put into the off state by an operator, for battery saving purposes.

SUMMARY OF THE INVENTION

Accordingly, in a first aspect of the present invention, a selective call radio, includes a receiver section, an address detector, an alerting device, a power off command detector, and a power control section. The receiver section is for receiving and demodulating a radio signal when power is supplied thereto. The radio signal includes an address. The address detector is coupled to the receiver section and is for comparing the address demodulated by the receiver section to at least one selective call address stored in the selective call radio. The address detector is also for generating an address detect signal when the address matches one of the at least one selective call address within predetermined parameters. The alerting device is coupled to the address detector and generates a sensible alert in response to the address detect signal. The power off command detector is coupled to the address detector and the receiver section and is for generating a power off signal when the address detect signal is generated and the radio signal includes a power off command. The power control section is coupled to the power off command detector and is arranged such that it is responsive only to the power off signal for changing a state of the selective call radio to an off state. When the selective call radio is in the off state essentially no power is supplied to the receiver section and the alerting device is disabled.

Accordingly, in a second aspect of the present invention, a method is for use in a selective call radio and includes the following steps. A step of receiving and demodulating a radio signal when power is supplied to a receiver section. The radio signal includes an address. A step of comparing the address demodulated by a receiver section of the selective call radio to at least one selective call address stored in the selective call radio. A step of generating an address detect signal when the address matches one of the at least one selective call address within predetermined parameters. A step of generating a sensible alert in response to the address detect signal. A step of generating a power off signal when the address detect signal is generated and the radio signal includes a power off command. A step of changing a state of the selective call radio to an off state in response only to the power off signal. In the power off state essentially no power is supplied to the receiver section, and said step of generating a sensible alert is disabled.

DETAILED DESCRIPTION OF THE DRAWINGS

A selective call radio 100 in accordance with the preferred embodiment of the present invention provides a unique combination of power control for a selective call radio 100 which prevents a user from changing the power state of the selective call radio to a state wherein the selective call radio 100 cannot receive a message and thereby generate an alert to the user, while also still providing a means for an operator of the radio communication system in which the selective call radio 100 operates to turn the selective call radio off, thereby conserving power. This combination of power control is particularly useful in situations where a battery powered pager is used for short periods of time by one or more users who may not be familiar with the operation of the pager, and may accidentally turn off the pager. An example is in the restaurant business, wherein a pager is loaned to a patron awaiting a table. A message is sent to the pager when the table is ready, and the pager alerts the patron. The operator of the pager in this example is a restaurant representative who wishes to conserve the battery life of the pager, but avoid customer dissatisfaction that arises if the message is not received.

Figure 1:
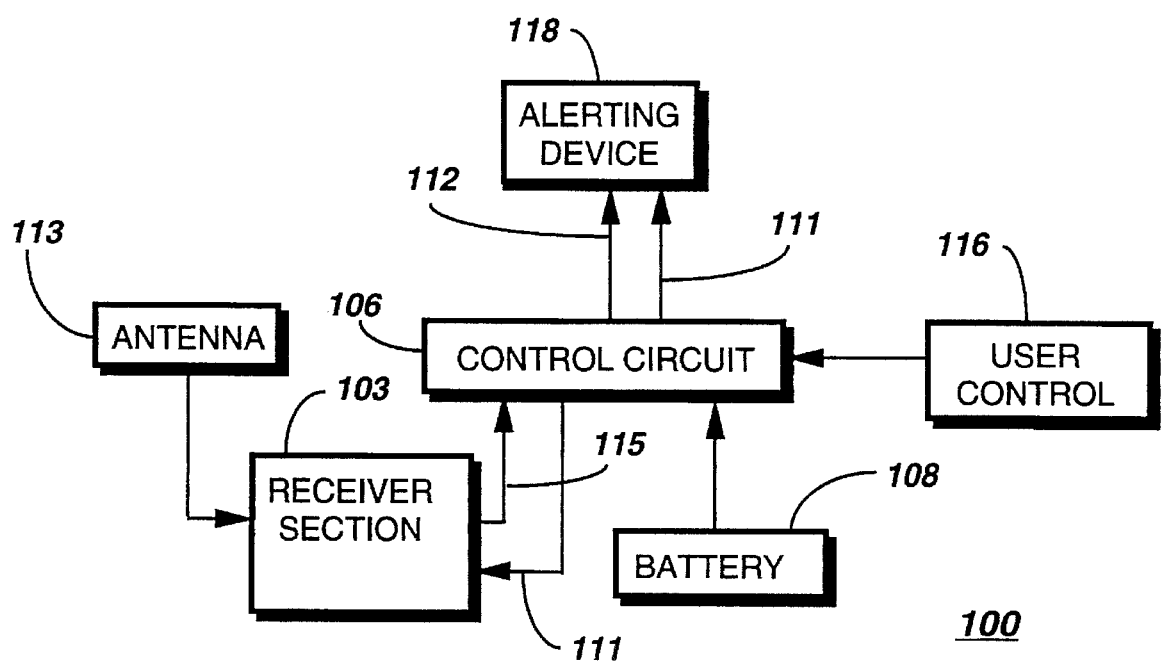
FIG. 1 is an electrical block diagram of a selective call radio, in accordance with the preferred embodiment of the present invention.

Referring to FIG. 1, an electrical block diagram of a selective call radio 100 is shown, in accordance with the preferred embodiment of the present invention. The selective call radio 100 operates in a radio communication system to intercept a radio signal having a predetermined carrier frequency which is modulated with an information signal. The radio signal is intercepted using an antenna 113 which is coupled to a receiver section 103. The receiver section 103 operates to amplify, convert, filter, and demodulate the intercepted radio signal, in a conventional manner. The demodulated signal 115 is coupled from the receiver section 103 to a control circuit 106, which includes conventional control logic for decoding the demodulated signal 115, including a selective call message, in a manner well known to one of ordinary skill in the art. The selective call message comprises an address and may include other information such as a command. A predetermined address is stored in the control circuit 106. The control circuit 106 is further coupled to a sensible alerting device 118. The control circuit is coupled to the sensible alerting device by an alert signal 112 and a power line 111. The control circuit 106 compares the address recovered from the selective call message to the predetermined address and continues processing the message when the comparison meets predetermined criteria. When the comparison does not meet predetermined criteria, the selective call radio 100 stops the processing of the selective call message. When the comparison does meet the predetermined criteria, the control circuit 106 further processes the message as determined by the contents of the recovered selective call message. The selective call radio 100 may also further process the selective call message by signaling a user via the sensible alerting device 118 that a selective call message has been received. A battery 108 is coupled to the control circuit 106 for providing the power required to operate the selective call radio 100. It will be appreciated that the selective call radio 100 could be of the type which also transmits an acknowledgment by means of radio signals.

The control circuit 106 is further coupled to the receiver section 103 and the alerting device 118 by a power line 111. The control circuit 106 maintains one of several power states, including a lowest power state which is an off state. In the off state, the power line 111 is turned off by the control circuit 106, eliminating essentially all supply of power from the battery 108 to the receiver section 103 and to the alerting device 118, preventing the selective call radio 100 from receiving any radio signals and the alerting device from generating the sensible alert, which in the preferred embodiment is an vibrator, but which could alternatively be a lamp or an audible transducer. In the off state, the control circuit 106 also eliminates the supply of power to all non-essential circuits in other portions of the selective call radio 100, including the control circuit 106, to reduce the power consumption from the battery 108 to several microamperes, which is a typical amount for currently available portable selective call radios such as pagers when in the off state. In an on state, the power line 111 is turned on by the control circuit 106, supplying power to the receiver section 103 and the alerting device 118 from the battery 108, and allowing the receiver section 103 to receive radio signals and the alerting device 118 to generate sensible alerts. In the on state, the control circuit 106 also supplies power from the battery 108 to other circuits in other portions of the selective call radio 100, including the control circuit 106, to perform normal functions of the selective call radio 100 as described above, which requires a few milliamperes of current from the battery 108 for the selective call radio 100. The few milliamperes of current is typical of currently available pagers operating in the on state.

Figure 2:
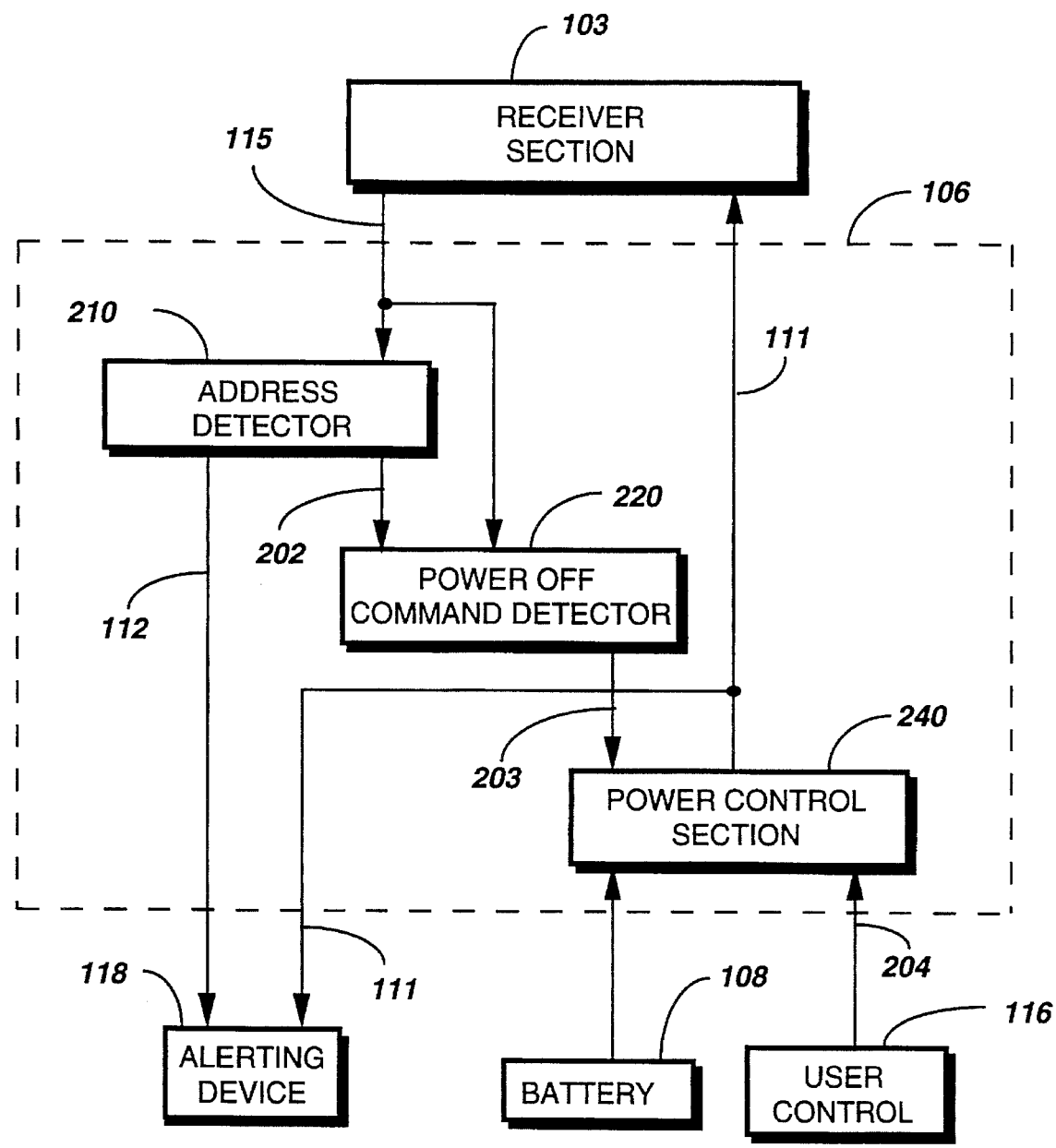
FIG. 2 is an electrical block diagram of a control circuit and other portions of the selective call radio, in accordance with the preferred embodiment of the present invention.

Referring to FIG. 2, an electrical block diagram of the control circuit 106 and other portions of the selective call radio 100 is shown, in accordance with the preferred embodiment of the present invention. The control circuit comprises an address detector 210, a power off command detector 220, and a power control section 240. The address detector 210 is coupled to the receiver section 103 and is for comparing the address included in the demodulated signal 115 to at least one selective call address stored in the selective call radio 100. When the address matches at least one of the at least one selective call addresses within a first set of predetermined parameters, the address detector 210 generates an alert signal 112. In the preferred embodiment of the present invention, the selective call radio 100 stores an individual address and a group call address of the selective call radio 100. When the address included in the message demodulated by the receiver section 103 matches the individual address or the group call address, the address detector 210 generates the alert signal 112. When the address matches at least one of the at least one selective call addresses within a second set of predetermined parameters, the address detector 210 generates an address detect signal 202. In the preferred embodiment of the present invention, when the address included in the message matches the individual address or the group call address, the address detector 210 generates the address detect signal 202. Thus, in the preferred embodiment of the present invention, the alert signal 112 is identical to the address detect signal 202. In a first alternative embodiment of the present invention, the address detect signal 202 is generated only when the address included in the message matches the group call address.

The power off command detector 220 is coupled to the address detector 210 and the receiver section 103, and is for generating a power off signal 203 when the address detect signal is generated and the demodulated signal 115 includes a power off command. The power control section 240 is coupled to the power off command detector 220. The power control section 240 is responsive to the power off signal 203 for turning the selective call radio 100 off by changing the state of the selective call radio 100 to an off state, and shutting off essentially all power supplied on power line 111, which is coupled to the receiver section 103. The receiver section 103 is changed to an off state in response to the power off signal, in which off state the receiver section 103 is supplied essentially no power from the battery 108 and is unable to receive any radio signals. The alerting device 118 is coupled to the power control section 240 by the power line 111, which prevents the alerting device 118 from generating alerts when the selective call radio 100 is in the off state, thereby preventing an alert from being generated for the message which includes the power off command. When the selective call radio 100 is in the off state, the power consumed by the selective call radio 100 is a minimum amount of power consumed by the selective call radio 100 in any power state of the selective call radio 100 which exists when the battery 108 is installed in the selective call radio 100. The alerting device 118 is coupled to the address detector 210 and is responsive to the alert signal 112 for generating a sensible alert in response to the alert signal 112. The user control 116 is coupled to the power control section 240 and generates an on signal 204 in response to a user action. The power control section 240 is responsive to the on signal 204 for turning the selective call radio 100 on by changing the state of the selective call radio 100 to an on state, and supplying power through power line 111, which is coupled to the receiver section 103. The receiver section 103 is thereby changed to an on state in response to the power line 111, in which on state the receiver section 103 is able to receive radio signals. In the on state, the power control section 240 is not responsive to the user control 116 or any other user controls for turning off the selective call radio 100.

It will be appreciated that in a second alternative embodiment of the present invention, the alerting device 118 could be coupled to an alert detector which is further coupled to said address detector 210 and said receiver section 103, for generating an alert only when the received radio signal includes a predetermined alert command and an address which matches a selective call address stored in the selective call radio 100.

Figure 3:
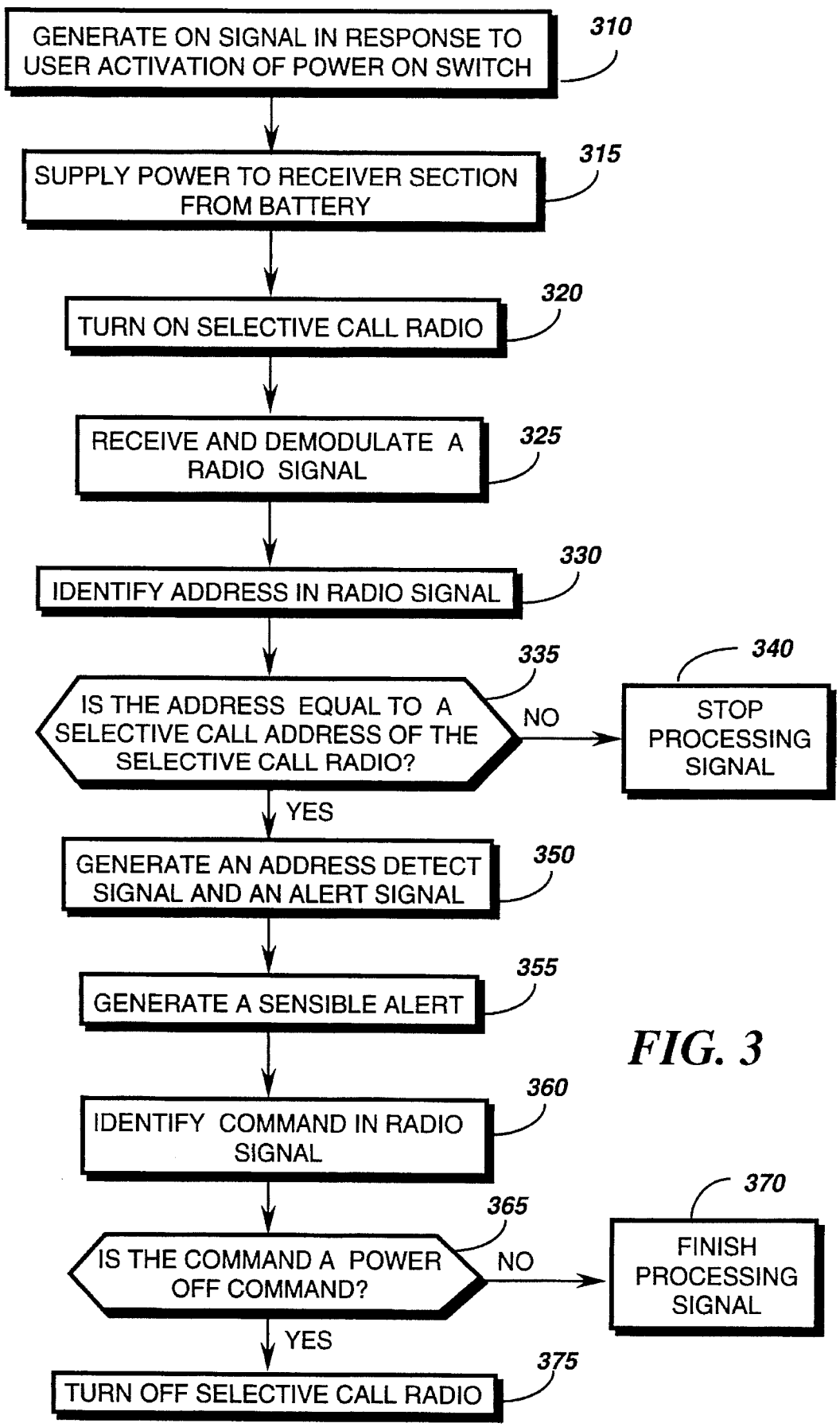
FIG. 3 is a flow chart of a method for use in the selective call radio 100, in accordance with the preferred embodiment of the present invention.

Referring to FIG. 3, a flow chart of a method for use in the selective call radio 100 is shown, in accordance with the preferred embodiment of the present invention. At step 310, an on signal 204 is generated in response to a user action, which in the preferred embodiment of the present invention is the depression of a conventional momentary contact push button switch 116. In response to the on signal 204, the power control section 240 supplies power to the receiver section 103, at step 315, which changes the state of the selective call radio 100 to an on state (or, in other words, turns on the selective call radio 100), at step 320. In the preferred embodiment of the present invention, the power is supplied from the battery 108. At step 325, a radio signal is received and demodulated. The radio signal includes an address. The address is identified in the radio signal by the control circuit 106, at step 330. The address detector 210 compares the address to at least one selective call address stored in the selective call radio 100. In the preferred embodiment of the present invention, the at least one selective call address is an individual address and a group call address. When the address is equal to either the individual address or the group call address at step 335, the address detector generates an address detect signal 202 and an alert signal 112 at step 350. When the address is not equal to either the individual address or the group call address at step 335, the control circuit 106 stops processing the radio signal, at step 340. In response to the alert signal 112, the alert device generates a sensible alert, at step 355, except as noted below. A command included in the radio signal is identified at step 360. When the command is determined to be a power off command at step 365, a power off signal 203 is generated. In response to the power off signal 203, the power control section 240 changes the state of the selective call radio 100 to an off state (or in other words, turns off the selective call radio 100). In the off state essentially no power is supplied to the receiver section 103 nor to the alert device 118. The alert device 118 is thereby disabled and does not generate a sensible alert for the message which includes the power off command. No further messages are received until the selective call radio 100 is turned on. When the command is determined not to be a power off command at step 365, the control circuit 106 finishes the processing of the radio signal at step 370, which in the preferred embodiment of the present invention is done by waiting for receipt of a new radio signal which includes the at least one selective call address.

The selective call radio 100 is preferably similar to a SiteMate™ model pager, manufactured by Motorola, Inc., of Schaumburg, Ill., and modified as described below, but may alternatively may be another of many selective call receiver radios. The SiteMate™ pager must be modified to provide the unique power control section 240 in the control circuit 106 and to have a conventional combination slide switch/ momentary push switch changed to a conventional momentary push switch, in accordance with the preferred embodiment of the present invention as described above. The address detector 210 is unmodified from that in the SiteMate™ pager. The power off command detector 240 is unmodified from that in the SiteMate™ pager, except for coupling a command detection used in the standard SiteMate™ pager to the power control section 220 as the power signal 203. The power control section 220 is modified to be responsive to the power control signal 203 and is modified to respond to the momentary push switch in the unique fashion as described above. The modifications to the control section 106 are firmware modifications. The procedure for making the firmware modifications is well known to one of ordinary skill in the art.

The selective call radio 100 is representative of other portable and mobile devices for receiving a radio signal which is modulated by an information signal. Other such portable and mobile devices include portable and mobile telephones and portable and mobile communication transceivers such as trunked radios, and may be powered by batteries or power mains.

The unique function of the user control 116 to only turn the selective call radio on provides a selective call radio 100 having features which prevent user dissatisfaction, particularly when the user is ignorant of the operation of the selective call radio. The unique feature of responding to a command to turn the selective call radio off allows the operator or owner of the selective call radio to conserve power when the selective call radio is not being used, which is especially important for battery operated selective call radios.

By now it should be appreciated that there has been provided an apparatus which improves customer satisfaction by preventing missed alert messages, and provides a convenient means of conserving power by a power off command message.

We claim:

1. A selective call radio, comprising:

a receiver section for receiving and demodulating a radio signal when power is supplied thereto, wherein the radio signal includes an address;

an address detector, coupled to said receiver section, wherein said address detector is for comparing the address demodulated by the receiver section to at least one selective call address stored in the selective call radio, and for generating an address detect signal when the address matches one of the at least one selective call address within predetermined parameters;

an alerting device, coupled to said address detector, for generating a sensible alert in response to the address detect signal;

a power off command detector, coupled to said address detector and said receiver section, for generating a power off signal when the address detect signal is generated and the radio signal includes a power off command; and a power control section, coupled to said power off command detector, wherein said power control section is arranged such that it is responsive only to the power off signal for changing a state of the selective call radio to an off state, and wherein when said selective call radio is in the off state, essentially no power is supplied to said receiver section and said alerting device is disabled.

2. The selective call radio according to claim 1, further comprising:

a user control, coupled to said power control section, for generating an on signal in response to a user action, wherein said power control section is responsive to said on signal for changing the state of the selective call radio to an on state, in which on state power is supplied to said receiver section, and wherein said power control section is not responsive to said user control for changing the state of the selective call radio to the off state.

3. The selective call radio according to claim 1, wherein the off state is a state in which power is essentially not supplied to said receiver section and wherein the selective call radio consumes a minimum amount of power of all power states of the selective call radio.

4. A method for use in a selective call radio, comprising the steps of:

receiving and demodulating a radio signal when power is supplied to a receiver section, wherein the radio signal includes an address;

comparing the address demodulated by the receiver section of the selective call radio to at least one selective call address stored in the selective call radio;

generating an address detect signal when the address matches one of the at least one selective call address within predetermined parameters;

generating a sensible alert in response to the address detect signal;

generating a power off signal when the address detect signal is generated and the radio signal includes a power off command; and changing a state of the selective call radio to an off state in response only to the power off signal, in which in the off state essentially no power is supplied to the receiver section and said step of generating a sensible alert is disabled.

5. The method according to claim 4, further comprising the step of:

generating an on signal in response to a user action, changing the state of the selective call radio to an on state in response to the on signal, in which in the on state power is supplied to the receiver section.

* * * * *